US010628596B2

(12) United States Patent
Kumar et al.

(10) Patent No.: US 10,628,596 B2
(45) Date of Patent: Apr. 21, 2020

(54) CONTROLLING A DOCUMENT ELECTRONIC-SIGNING (E-SIGNING) WORKFLOW BASED ON CRITERIA SPECIFIED BY A DOCUMENT SENDER

(71) Applicant: Adobe Inc., San Jose, CA (US)

(72) Inventors: Divij Kumar, New Delhi (IN); Aditya Kumar Pandey, New Delhi (IN)

(73) Assignee: Adobe Inc., San Jose, CA (US)

( * ) Notice: Subject to any disclaimer, the term of this patent is extended or adjusted under 35 U.S.C. 154(b) by 866 days.

(21) Appl. No.: 15/167,694

(22) Filed: May 27, 2016

(65) Prior Publication Data

US 2017/0344245 A1 Nov. 30, 2017

(51) Int. Cl.
| G06F 21/62 | (2013.01) |
| H04L 12/58 | (2006.01) |
| G06Q 10/10 | (2012.01) |
| G06Q 50/18 | (2012.01) |
| G06F 21/64 | (2013.01) |

(52) U.S. Cl.
CPC ........ *G06F 21/6209* (2013.01); *G06F 21/645* (2013.01); *G06Q 10/10* (2013.01); *G06Q 10/103* (2013.01); *G06Q 50/18* (2013.01); *H04L 51/08* (2013.01)

(58) Field of Classification Search
CPC ... G06F 21/629; G06F 21/645; G06Q 10/103; G06Q 10/10; G06Q 50/18; H04L 51/08
See application file for complete search history.

(56) References Cited

U.S. PATENT DOCUMENTS

2016/0048696 A1\* 2/2016 Follis .................. G06F 21/6209
726/28

\* cited by examiner

*Primary Examiner* — Andrew L Tank
(74) *Attorney, Agent, or Firm* — SBMC

(57) ABSTRACT

An E-signing workflow enables an E-document to be signed by multiple parties including a document signer and a third-party, such as a guarantor. The E-signing workflow employs various online detours that enable addition of third parties to an E-document. The E-signing workflow enables a complete audit trail to be easily and automatically developed for a document sender and signers, and associated with a particular E-document. Privacy concerns are addressed by way of secure electronic communications that take place between the parties within the E-signing workflow. The E-signing workflow reduces reliance on e-mail for document execution insofar as most if not all relevant activities in the E-signing workflow take place within the workflow and result in storage of the E-document and all relevant information within the E-signing solution itself.

20 Claims, 10 Drawing Sheets

300
To: Farouk Daniel
From: Anand Louis
Please provide the qualifying criteria before signing this document.
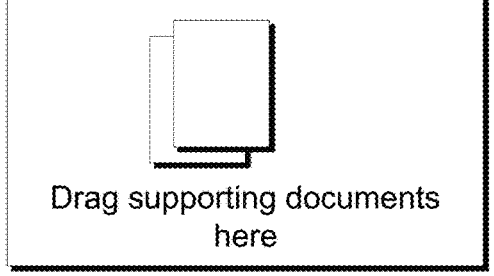
Drag supporting documents here — 304
Qualifying Criteria — 302
1. Credit Score ●
2. Income record for 2 years ○
Check circle to allow online electronic signature provider to secure information
306
Send
*Fig. 3*

500

**FDAL Agreement
Audit Trail**
— 502

Created: 2/25/2016

By: Anand Louis

Status: waiting for signatures

Transaction ID: sdfgml340lg-5dkdjgo

Document created by Anand Louis
2/25/2016  2:30 PST

Document e-mailed to Farouk Daniel
2/25/2016  3:32 PST

Farouk Daniel Income record for two years provided
2/28/2016  4:15 PST
Link: P:transactions\FDAL\Daniel\criteria Farouk Daniel authorization for credit score acquisition received
2/28/2016  4:15 PST Farouk Daniel credit score obtained from XYZ Corp.
3/5/2016  2:10 PST
Link: P:transactions\FDAL\Daniel\criteria Rules check performed; PASSED
3/5/2016  3:10 PST

CONTROLLING A DOCUMENT ELECTRONIC-SIGNING (E-SIGNING) WORKFLOW BASED ON CRITERIA SPECIFIED BY A DOCUMENT SENDER

BACKGROUND

Electronic signing (E-signing) solutions are extensively used these days to sign a wide variety of agreements such as business rental agreements, house lease agreements, loan agreements, debt settlement agreements, investment agreements, purchase agreements, vendor agreements, licensing agreements, and so on. The areas where electronic signing is being used are endless, as it provides a convenient and time-efficient alternative to physically signing a document. Many E-signing solutions simply e-mail an electronic document to an individual for execution. After the user executes the electronic document, the user can simply attach it to an e-mail response to the sending party. E-mailing such documents can present a security risk in so far as the potential for an e-mail response, and any supporting personal information, to be intercepted by an unintended, malicious recipient.

In some of the agreements mentioned, in which two parties generally sign, there may be a requirement to have a signing party qualify before he or she can sign an agreement. Such requirements can include a credit score and history check, a criminal background record check, residency verification, income verification, presence of a guarantor, and/or sensitive personal information, to name just a few.

At present, these requirements and associated documents and records require an offline detour for individuals who must satisfy these requirements. In addition to the security risks posed by e-mail exchanges in this context, off-line detours can, in turn, lead to delays and inefficiencies in completing an agreement. As an example of an offline detour during an e-signing workflow process, consider the following. When leasing a house, the leasing authority or the landlord may require a guarantor to guarantee the timely payment of rent and other tenancy obligations. The leasing authority will often not know the party who is participating as a guarantor or as a signing party. Hence, it becomes important for the leasing authority to verify the credit history and credit score or credit worthiness of the guarantor and/or the signing party. The credit history, however, may not be easily obtainable by the leasing authority. That is, the leasing authority must contact the guarantor outside the flow of the e-signing workflow process and request confidential data. This confidential data, if shared over e-mail, may be lost, stolen or misused.

Further, as a result of the offline detour, the requirements and documents are typically tracked outside the e-signing workflow process, and there is usually no audit trail detailing whether the records were produced, what those records were, when the records were produced and/or whether the records were checked and by whom prior to signing of an agreement. For example, the leasing authority may keep the agreement in one location and may keep any associated guarantor information in another location, with no real association or link between the agreement and the guarantor information and supporting information showing that the information was obtained and verified.

Such a gap between documents can lead to problems and complications if a dispute arises with respect to a particular agreement, particularly if the guarantor information is lost.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Various embodiments control an E-document electronic-signing workflow based on criteria specified by a document sender. An E-document is received from a document sender and defines a contractual agreement between the document sender and at least one document signer. The E-document is processed to identify the document signer and qualifying criteria specified by the document sender. The qualifying criteria pertains to criteria that is required before the document signer can sign the E-document. The E-signing workflow is paused to transmit a request to a third party for the criteria that is required before the document signer can sign the E-document. The required criteria is received and, responsive to an evaluation of the criteria, the E-signing workflow is unpaused to invite the document signer to E-sign the E-document.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 3 is an illustration of an example E-signing request in accordance with one or more implementations.

FIG. 5 is an illustration of an example audit trail in accordance with one or more implementations.

DETAILED DESCRIPTION

Overview

Figure 1:
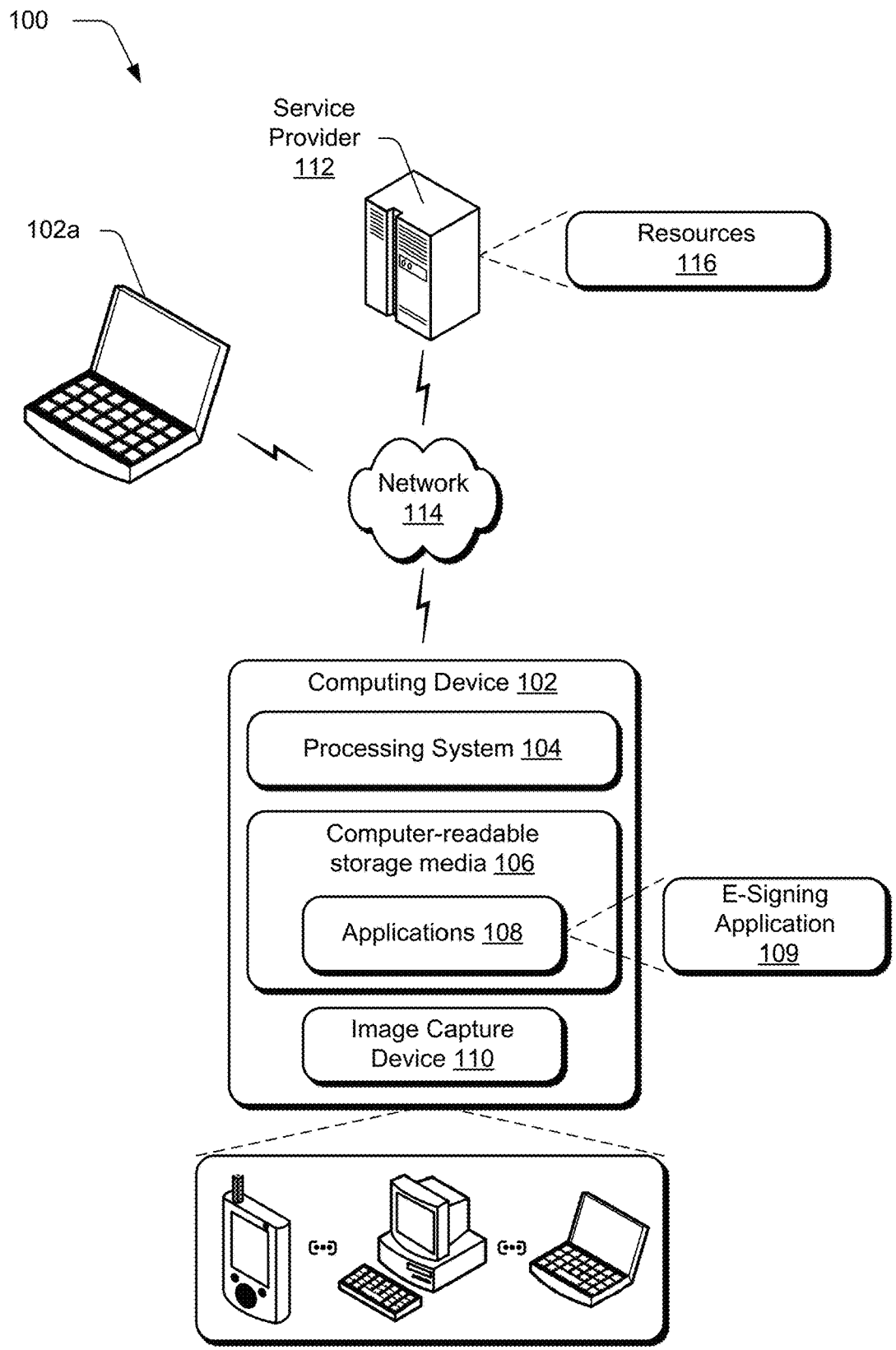
FIG. 1 is an illustration of a digital medium environment in an example implementation that is operable to employ techniques described herein.

In the description below, an approach to an electronic-signing (E-signing) workflow for securing an executed E-document can pause the workflow at various points and then incorporate the use of one or more online detours to enable relevant supporting information and documentation—termed "qualifying criteria" below—to be collected and evaluated. Once the qualifying criteria is evaluated and verified, relevant signatures can be collected. In some embodiments, a complete audit trail is automatically and easily produced, and associated with the executed E-document. The description provided below will make use of the following terms:

E-document: an electronically transmittable document that is sufficient to enable a document sender, a document signer, and, optionally, one or more third parties to enter into a contractual agreement by providing an electronic signature.

Electronic signature: an electronic signature or E-signature, is a legal way to acquire consent or approval on electronic documents (E-documents) or forms. Electronic signatures can be considered as an electronic sound, symbol, string of characters, or process attached to or logically associated with a document and adopted by a person with the intent to sign the document.

E-signing workflow: a process by which an E-document is electronically sent out for processing by a service provider or for signature to the relevant parties and the final signed version is produced or received.

Online electronic signature service provider: a service provider that provides electronic signature services to facilitate execution of an E-document and supports activities to organize, facilitate, and execute or enable execution of an E-signing workflow and collects and evaluates relevant information associated therewith.

Document sender: a party to and signer of an E-document; the document sender is typically a provider of some type of good or service or some other subject matter that is the subject of the contractual agreement defined by the E-document.

Document signer: a party to and signer of an E-document; the document signer is typically a consumer of the good or service or other subject matter that is the subject of the contractual agreement defined by the E-document.

Third-party: when present, a participant in the process by which an E-document is signed by the document signer; typically, the third-party will bear some responsibility for the document signer, whether that responsibility be financial or otherwise, in order to enable operation of the contractual agreement defined by the E-document; alternately or additionally, the third party may provide information, such as qualifying criteria, that is required or desirable to enable the contractual agreement defined by the E-document to come into being.

Qualifying criteria: refers to any criteria that may be required or desirable from the document signer and/or third-party to enable the contractual agreement defined by the E-document to come into being including, by way of example and not limitation, approvals, checks, records, proofs, verifications, certifications, credit score, history check, criminal background record check, verifiable residency records, verifiable income records, presence of a guarantor, proof of age, citizenship, residency, and the like.

Online detour: refers to a process that takes place by pausing the E-signing workflow and enables any necessary items such as verifications (and related documents or links thereto), certifications (and related documents or links thereto), qualifying criteria (and related documents or links thereto) and additional information sufficient to enable execution of the E-document.

Audit trail: a description of all relevant information gathered during the E-signing workflow and the online detours including various events, event dates, participating parties, and supporting documents such as verifications (and related documents or links thereto), certifications (and related documents or links thereto), qualifying criteria (and related documents or links thereto) and any other relevant additional information.

Introduced here are techniques that address the drawbacks of previous approaches, such as those mentioned above. The techniques utilize a novel E-signing workflow that provides a seamless and time-efficient way of collecting and evaluating qualifying criteria for a document signer or third-party so that the E-document can be signed. The E-signing workflow employs one or more online detours after the E-signing workflow is initiated. For an online detour, the E-signing workflow is paused to request and collect qualifying criteria. This is done before the document signer or any third parties sign the E-document. Once the qualifying criteria is obtained and processed, such as by being verified, the E-signing workflow can be un-paused and any required signatures can be obtained. Pausing the E-signing workflow to request and collect qualifying criteria seamlessly and efficiently enables third parties to participate in a process in which an E-document is created. For example, a document sender, using an E-signing application, may build an E-document. The E-document defines a contractual agreement between the document sender and at least one document signer. In some instances, the document sender may specify that certain qualifying criteria is required before the document signer can sign the E-document. The qualifying criteria can include a specification that one or more third parties are to participate either in a signing or non-signing capacity. The E-signing workflow is tracked based on obtaining the qualifying criteria and verifying that the qualifying criteria is met. The E-document is then uploaded to an online electronic signature service provider by the document sender to initiate an E-signing workflow.

The online electronic signature service provider receives the uploaded E-document and processes the E-document. This includes identifying document signers who are to sign the E-document, third parties who are required to submit qualifying criteria and/or sign the E-document, and any qualifying criteria specified by the document sender that is to be submitted by the document signer. The online electronic signature service provider can then pause the E-signing workflow and transmit an E-signing request to one or more document signers. The E-signing request can include a request to identify any third parties and their associated contact information.

The document signer or signers receive the E-signing request and can provide the contact information for any third parties. This can be performed in conjunction with acquiring any qualifying criteria from the document signer that was specified by the document sender. While the E-signing workflow is paused, the online electronic signature service provider can collect and verify qualifying criteria from any required third parties. Once the qualifying criteria is met, the E-signing workflow can be unpaused and the E-document can be sent to the document signer and third party for signature.

In addition, the E-signing workflow enables a complete audit trail to be easily and automatically developed for the document sender and signers, and associated with a particular E-document. Privacy concerns are addressed by way of secure electronic communications that take place between the parties within the E-signing workflow. Signing parties can control who sees their relevant information and when, if at all, the relevant information may be deleted. The E-signing workflow reduces reliance on e-mail for document execution. In addition, the online electronic signature service provider can track various qualifying criteria for document signers and third parties during the entire term of the agreement. This allows for the document sender to monitor and ensure that document signers and third parties can continue to meet their contractual obligations under the agreement.

In operation, the E-signing workflow can include one or more documented online detours in which the workflow is paused to request and obtain qualifying criteria. The qualifying criteria is then verified or otherwise processed, and then the E-signing workflow is unpaused to collect the necessary signatures. Detours can allow a document signer or third-party to safely provide personal details that are required in order to have the E-document signed. An online detour may also be used to allow a document signer to invite a third-party to the agreement or to otherwise participate in the process by which the E-document is signed by the document signer. For example, as described in the section below entitled "Implementation Example", the document signer may invite a guarantor to the agreement. The guarantor is responsible for fulfilling one or more of the contractual obligations of the guaranteed party—here, the document signer.

Such an invited third-party may need to provide various verifiable information and qualifying criteria in order to serve in the capacity for which they have been invited. Such capacity may include a signing capacity or a non-signing capacity. When the E-signing workflow is paused, the third-party can be provided a safe and secure environment to provide the necessary information and qualifying criteria during the online detour. The online electronic signature service provider may then perform verification actions such as credit history checks and the like, before approving the third-party in their invited capacity. Once any verifications have been performed, the E-signing workflow can be unpaused and the required signatures can be obtained. As noted above, the E-signing workflow reduces reliance on e-mail or physical forms in favor of a hosted service that provides for secure communication of data between and amongst the participants. In various embodiments, the online electronic signature service provider can integrate with entities that can provide or otherwise verify qualifying criteria, such as various record providers, report providers, verification authorities, certification authorities, and the like. In this manner, acquisition of information and verification of qualifying criteria takes place within the E-signing workflow, is managed and overseen by the online electronic signature service provider, and automatically becomes part of the audit trail.

In the following discussion, an example digital medium environment is first described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 (and at least a computing device 102a), each including a processing system 104 that may include one or more processing devices, one or more computer-readable storage media 106, and various applications 108 embodied on the computer-readable storage media 106 and operable via the processing system 104 to implement corresponding functionality described herein. In at least some embodiments, applications 108 may include an E-signing application 109. The E-signing application 109 is configured to enable an individual to participate in an E-signing workflow. The E-signing application can also enable an individual to construct an E-document with various fields that are relevant to an agreement that an individual may wish to have executed.

Computing device 102 may be associated with a document sender that wishes to have an E-document executed. Computing device 102a may be associated with a document signer or third-party that is participating in the agreement defined by the E-document. Computing device 102a may also include an E-signing application.

The E-signing application may be a standalone application dedicated specifically for E-signing workflows, such as a native application. Alternately or additionally, the E-signing application may be proprietary software executable by an application, such as a web browser, to permit secure communication between the E-signing application and a hosted service, such as one hosted by an online electronic signature service provider.

Applications 108 may also include a web browser which is operable to access various kinds of web-based resources (e.g., content and services). The applications 108 may also represent a client-side component having integrated functionality operable to access web-based resources (e.g., a network-enabled application), browse the Internet, interact with online providers, and so forth. Applications 108 may further include an operating system for the computing device and other device applications.

The computing device 102 may also, but need not, include an image capture device 110, such as a camera, that can capture images.

The computing device 102 may be configured as any suitable type of computing device. For example, the computing device may be configured as a desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 10.

The digital medium environment 100 further depicts one or more service providers 112, configured to communicate with computing devices 102, 102a over a network 114, such as the Internet, to provide a "cloud-based" computing environment. Generally speaking, a service provider 112 is configured to make various resources 116 available over the network 114 to clients. In some scenarios, users may sign up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, an electronic signature service (such as one that employs or otherwise makes use of an E-signing application 109), a web development and management service, a collaboration service, a social networking service, a messaging service, an advertisement service, and so forth. Content may include various combinations of assets, video comprising part of an asset, ads, audio, multi-media streams, animations, images, web documents, E-documents, web pages, applications, device applications, and the like.

In the illustrated and described embodiment, service provider 112 is an online electronic signature service provider that provides electronic signature services to facilitate execution of an E-document and support activities to organize, facilitate, and execute or enable execution of an E-signing workflow. In various embodiments, the electronic signature services are a cloud-based, enterprise-class E-signature service that replaces paper and ink signature processes with fully automated electronic signature workflows. The electronic signature services enable users to easily send, sign, track, and manage signature processes using an application, such as a browser, or a mobile device. In the illustrated and described embodiment, service provider 112 manages the complete process, including routing documents, pausing the E-signing workflow to enable information to be collected, processed or verified, guiding signatures or approvals after verification of collected information, generating notifications, and storing signed documents, including audit trail information, in a secure environment. Thus, such creates a unified and integrated record regarding all relevant activities that take place both during an E-signing workflow and when the E-signing workflow is paused. In addition, a final document can be certified with a tamper-evident seal. An example of such a service is Adobe Document Cloud and Adobe Sign services.

Various types of input devices and input instrumentalities can be used to provide input to computing device 102. For example, the computing device can recognize input as being a mouse input, stylus input, touch input, input provided through a natural user interface, and the like. Thus, the computing device can recognize multiple types of gestures including touch gestures and gestures provided through a natural user interface.

Having considered an example digital medium environment, consider now a discussion of some example details of online detours during an E-signing workflow in accordance with one or more implementations.

Example E-Signing Workflow

In one or more embodiments, when a document sender wishes to have an agreement executed, the document sender can utilize an online electronic signature service provider. In many cases, the document sender will maintain an account with the online electronic signature service provider. Once the document sender logs into their account, they can interact with an E-signing application, such as E-signing application 109 (FIG. 1), by way of a suitably-configured user interface. As noted above, the E-signing application can be a stand-alone application. Alternately or additionally, the E-signing application can reside in the form of functionality that is accessible by way of a web browser. In one or more embodiments, a secure communication protocol is utilized to enable the document sender and others to interact with the online electronic signature service provider in a manner that preserves the security of the communications and any information or data exchanged between the parties. Secure communication can take place using, for example, HTTPS.

Alternately or additionally, a secure communication protocol such as Transport Layer Security (TLS) can be used to encrypt the communication between the parties. Thus, information can be securely communicated outside of normally unsafe email channels.

Figure 2:
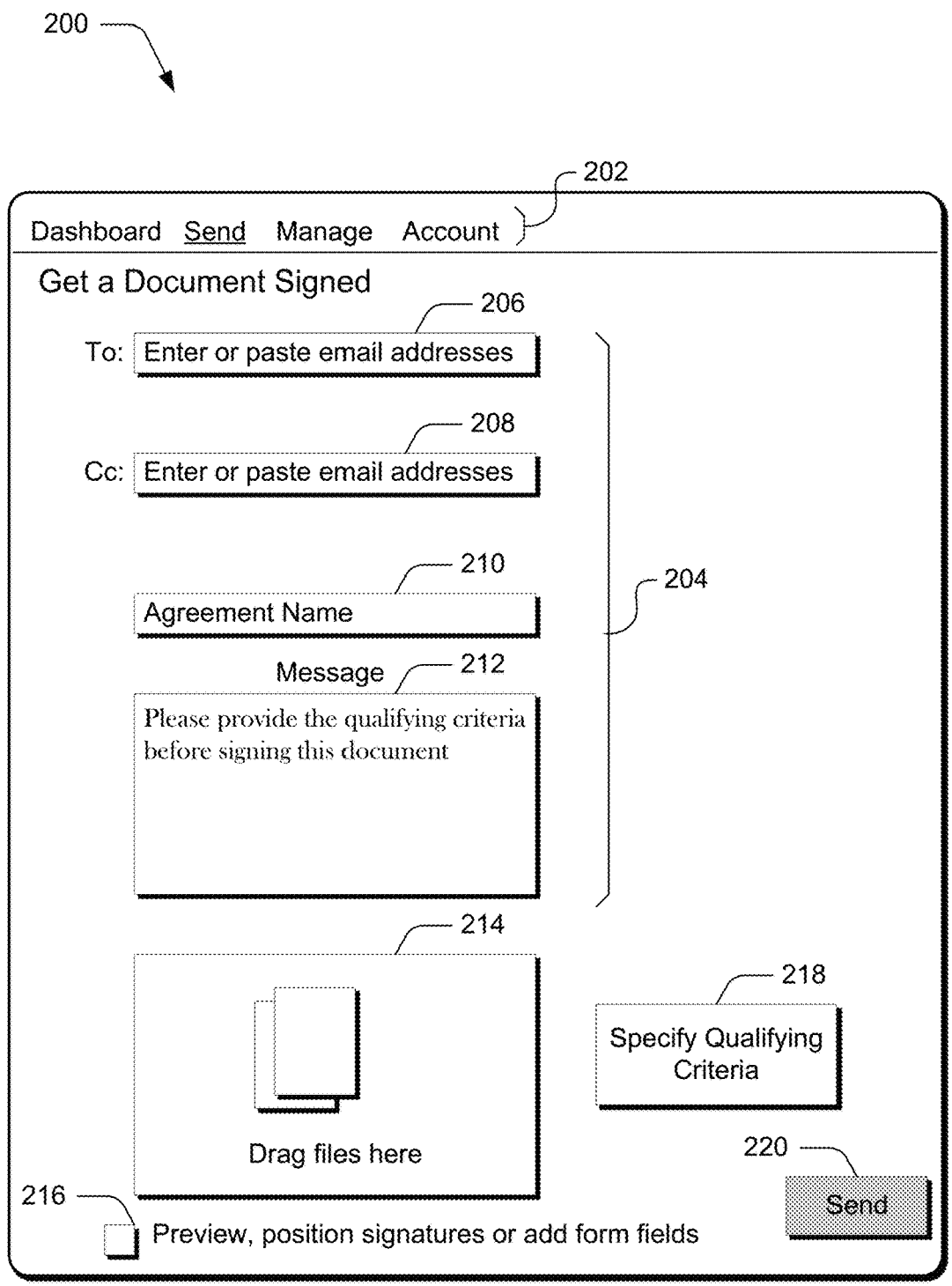
FIG. 2 is an illustration of an example user interface in accordance with one or more implementations.

As an example of a user interface that can be used to interact with the online electronic signature service provider, consider FIG. 2. There, a user interface is shown generally at 200. User interface 200 includes a number of management tabs 202 that can be selected by the document sender to interact with the E-signing application. In this particular example, the management tabs 202 include a "Dashboard" tab, a "Send" tab, a "Manage" tab, and an "Account" tab.

The Dashboard tab can be used to enable the user to access general information about their account. The Send tab can be used to enable the user or document sender to provide relevant information to enable an E-document to be distributed amongst the various parties. The Manage tab can be used to enable user to access various functionality to manage their account and various E-documents. The Manage tab can additionally be used to access an audit trail that is automatically created and associated with a particular E-signing workflow, as described below in more detail. The Account tab can be used to enable a user to manage various account settings.

In this particular instance, the user has selected the Send tab to begin the process of providing information that can be used to acquire signatures and other relevant information for an E-document. In this manner, the user can provide the necessary information to educate the control logic that executes the E-signing workflow.

In this example, the user interface 200 includes a recipient and message portion 204. In this portion, the user can use fields 206 and 208 to enter e-mail addresses of individuals who need to sign or review the E-document. This can include various document signers and third parties as discussed above and below. The user can enter the name of the agreement in field 210 and can provide a short message to the recipients in message field 212. In this particular example, the user has entered the message "Please provide the qualifying criteria before signing this document." Examples of qualifying criteria are provided above and below.

A user interface portion 214 provides an area for the document sender to drag and drop the E-document that is to be signed. A checkbox 216 is provided to enable the document sender to preview the E-document and position data boxes for signatures and any other information for the signers of the document. This can include positioning signature boxes for the document signers and various third parties that might be a party to the agreement defined by the E-document.

In one or more embodiments, a button 218 or other user interface instrumentality is provided to enable the document sender to specify qualifying criteria that must be provided in connection with and before signing the E-document. In various embodiments, once initiated, the E-signing workflow can be paused to enable any online detours to collect and process qualifying criteria. Information acquired during the online detour and the facts and circumstances surrounding its acquisition can be associated with the E-document. Moreover, as will become apparent below, a detailed audit trail can be easily automatically provided, along with supporting documentation.

In some instances, the qualifying criteria must be satisfied before a document recipient is able to sign the E-document. In one or more embodiments, the qualifying criteria may be rule-based or subjective in nature. In a rule-based approach, qualifying criteria provided by a party can be easily tested against defined rules. Subjective criteria, on the other hand, is less rule-based and subject to evaluation by either the document sender or some other party, such as the online electronic signature service provider. Qualifying criteria can be any suitable type of criteria defined by the document sender. Specific examples of qualifying criteria can include, by way of example and not limitation, credit score and history check, criminal background records check, verifiable residency records for the past "N" years, verifiable income records for the past "X" years, and the like.

Once the document sender has completed providing the information necessary for the E-document to enter into the E-signing workflow, the document sender can click a send button 220 which sends the information provided by the document sender to the online electronic signature service provider. The online electronic signature service provider can then initiate the E-signing workflow by either sending the E-document to the parties specified by the document sender, or notifying various parties that an E-signing workflow has been initiated to secure signatures on an E-document.

In instances when the document sender has specified qualifying criteria, the online electronic signature service provider may send each recipient an E-signing request that includes an indication that the recipient needs to provide specified qualifying criteria before they are permitted to sign the E-document. This can be done in the form of an e-mail that includes a secure link to navigate the recipient to a user interface that allows them to securely provide the requested information. This constitutes a first online detour during which the E-signing workflow is paused to collect qualifying criteria. Information acquired during the online detour can be easily securely stored and incorporated into the audit trail. The E-signing request may or may not include the E-document itself or a link to the E-document. If the E-signing request does include the E-document, the document may, in some instances, be locked until the recipient has provided the qualifying criteria and the qualifying criteria has been verified by either the online electronic signature service provider or the document sender.

As an example, consider FIG. 3 which shows an example E-signing request 300. The request includes the short message provided by the document sender and an enumeration of the qualifying criteria that the recipient is to provide. In this particular instance, the recipient is to provide a credit score and income records for two years. A user interface instrumentality, such as a checkbox 302, is provided for each of the qualifying criterion so that the recipient can provide permission for the online electronic signature service provider to secure the information. In this particular example, the recipient has checked the box for the credit score, thus allowing the online electronic signature service provider to acquire this information on behalf of the recipient. A user interface portion 304 is provided to enable the recipient to drag and drop supporting documents. So, for example, the recipient may have a document that details their income record for each requested year. The recipient can drag-and-drop the supporting documents into user interface portion 304 and click the send button 306 to securely send this information to the online electronic signature service provider.

Once the online electronic signature service provider receives the response to the E-signing request, if the criterion set by the document sender is rules-based, the online electronic signature service provider may, after acquiring or receiving the supporting documents for the qualifying criteria, test the rules-based qualifying criteria against the documents of the document signer. If the document signer qualifies to E-sign the E-document, the E-signing workflow can be unpaused and the document signer can be invited to sign the E-document. This can include either sending the E-document to the signer or, alternatively, unlocking the E-document if it was previously sent to the document signer. Alternately, the online electronic signature service provider may send a separate communication such as an e-mail containing a secure link to the E-document, as described below. If, on the other hand, the criterion set by the document sender is more subjective in nature, the online electronic signature service provider may inform or notify the document sender to decide on the qualification of the document signer. This can include providing access for the document sender to any supporting documents provided by the document signer.

Figure 4:
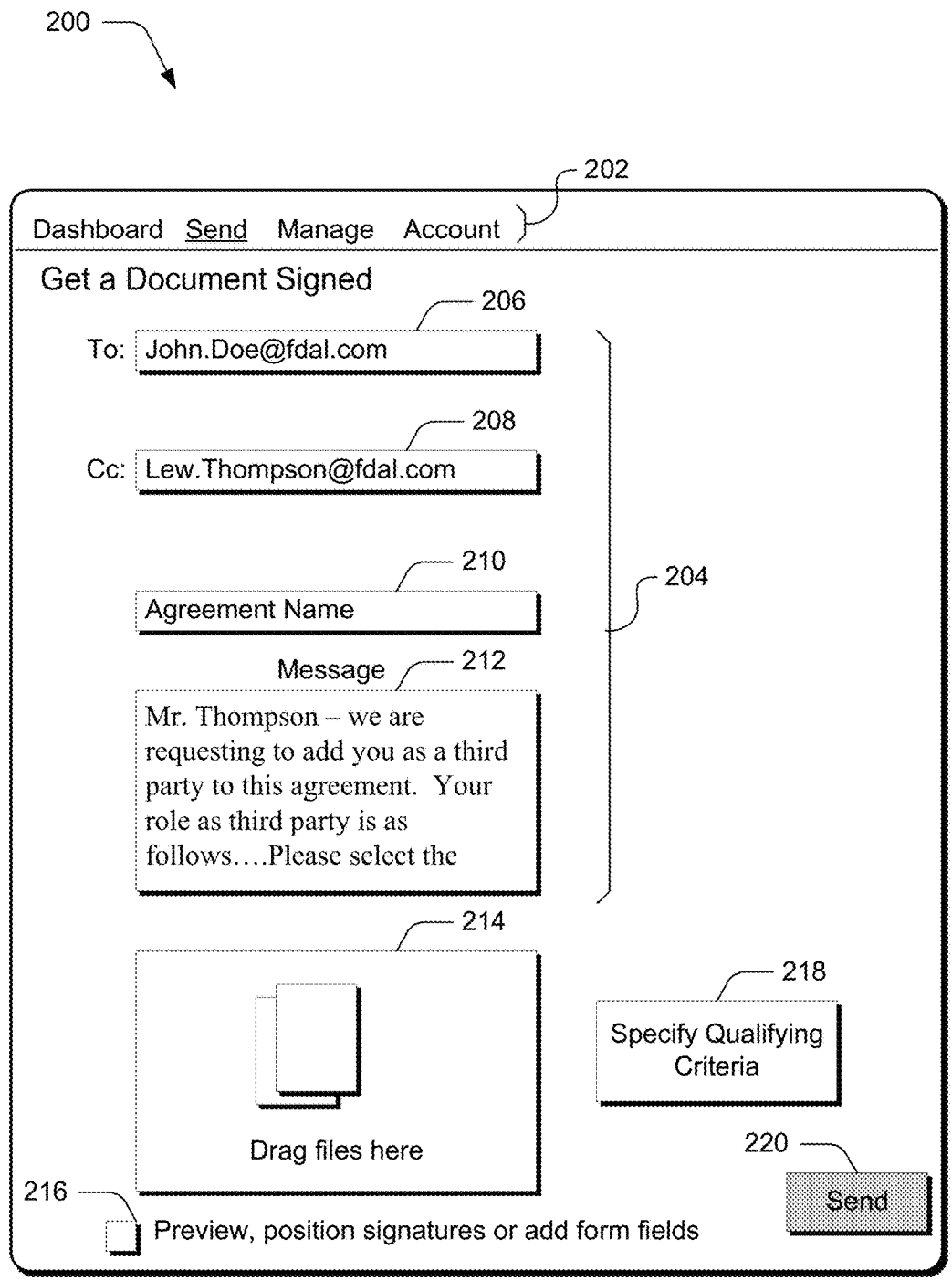
FIG. 4 is an illustration of an example user interface in accordance with one or more implementations.

In one or more embodiments, the document sender may wish to optionally incorporate, in addition to one or more document signers, one or more third parties to an agreement—either as a signing party or a non-signing party. When included as part of the agreement or the activities leading to execution of the agreement, as noted above, the third-party typically bears some responsibility for the document signer in order to enable operation of the contractual agreement defined by the E-document. As an example, consider FIG. 4 which illustrates the user interface of FIG. 2, where like numerals are utilized.

Notice in the "Cc" field 208, the document sender has added a third-party e-mail address "Lew.Thompson@fdal.com" along with a message in message field 212 "Mr. Thompson—we are requesting to add you as a third party to this agreement. Your role as third party is as follows . . . . Please select the 'specify qualifying criteria' button and provide the qualifying criteria specified for you." In this particular instance, the qualifying criteria that is specified for the third party may be different from the qualifying criteria specified for the document signer. As in the FIG. 2 example, when the third party receives the E-signing request from the online electronic signature service provider, such as the one shown in FIG. 3, a second online detour can take place in which the E-signing workflow is paused and qualifying criteria is obtained and processed. Specifically, the third party can similarly provide the requested information and documentation associated with the qualifying criteria or can authorize the online electronic signature service provider to acquire the information. The third party can then click the send button 306 to reply to the E-signing request. Once the qualifying criteria for the third party has been verified by the online electronic signature service provider, the E-signing workflow can be unpaused and the required signatures can be obtained. It is possible, as noted below, that the document sender will not know the specific third-party at the time the E-signing request is sent to the document signer. In this case, the document sender would have modified the E-document to include fields for the third party's name and address so that the online electronic signature service provider can execute a detour to incorporate the third-party into the agreement, as described below in more detail.

In some embodiments, after verifying the qualifying criteria, the online electronic signature service provider can unpause the E-signing workflow by sending a communication, such as an e-mail, to the relevant parties in order to advance the E-signing workflow. The communication can, in some instances, contain a secure link to the E-document which now allows the E-document to be signed. The link can enable the E-document to be loaded in the E-signing application. Alternately or additionally, the link can enable the E-document to be securely loaded in a web browser.

In some embodiments, when the document signer has been verified by the online electronic signature service provider and receives the E-document for signature, the document signer can sign the document and, if a third party was not previously specified but needs to be part of the agreement, the document signer can add the name and contact information, such as an e-mail address, of the party that the document signer wishes to use as the third-party. The document signer can then upload the signed E-document or upload the signature information to the online electronic signature service provider using the E-signing application or their web browser.

In instances where the third-party is first specified when the document signer signs the E-document (that is, the online signature provider is initially unaware of the identity of the third-party), the online electronic signature service provider will now need to secure an electronic signature for the third-party and may need to now retrieve or otherwise acquire qualifying criteria for the third-party.

In this particular scenario, three possibilities exist with respect to the third-party, each of which is discussed just below. First, the third-party may not be registered with the online electronic signature service provider. Second, the third-party may be registered with the online electronic signature service provider, but the third-party's qualifying criteria is not on file and available to the online electronic signature service provider. Third, the third-party may be registered with the online electronic signature service provider and the third-party's qualifying criteria is on file and available to the online electronic signature service provider.

Third-Party not Registered

In the event that the third party is not registered with the online electronic signature service provider, the E-signing workflow can be paused and an invitation e-mail can be sent to the third-party using the e-mail address provided by the document signer. By clicking a link in the e-mail, the third-party can be marshaled through an account creation process to create an account with the online electronic signature service provider so that the third party can now be registered with the online electronic signature service provider. Once registered, the process can now progress as described below, including acquisition of any required qualifying criteria.

Third-Party Registered but Qualifying Criteria Missing

In the event the third-party is registered with the online electronic signature service provider but the relevant qualifying criteria is missing, the E-signing workflow can be paused and the online electronic signature service provider can securely send the third-party the E-document in a manner similar to that described above. If the third party agrees to be a party to the E-document, the third-party can then provide any necessary qualifying criteria in a manner similar to that described in FIG. 3. That is, the third-party can provide the supporting information themselves or can authorize the online electronic signature service provider to do so. This can include providing personal information such as date of birth, permanent address, Social Security number, father's or mother process name, and the like. If the third-party authorizes the online electronic signature service provider to collect information for the qualifying criteria, the online electronic signature service provider may select a third-party service to do so. An example of third-party services, are those offered by Experian, Equifax or TransUnion that can be used to retrieve a credit score, given a person's name and social security number. The supporting information can, in some instances, be obtained through the use of secure APIs that allow the online electronic signature service provider to integrate and provide customers a seamless experience. Retrieving reports and other information using companies such as these generally involves some type of payment which may be paid either by the document sender or the document signer. Once the qualifying criteria has been received and verified, the E-signing workflow can be unpaused and the required signatures can be collected.

Third-Party Registered and Qualifying Criteria Present

If the third-party is registered with the online electronic signature service provider and the third-party's qualifying criteria is present, the process may proceed as described below.

Assume now that for each of the three alternatives described above, the online electronic signature service provider has the third-party's qualifying criteria. The qualifying criteria can now be evaluated, in a manner similar to that described above, to ascertain whether the third-party can serve in the role specified by the document sender. This can include evaluating the qualifying criteria using a rule-based approach, if appropriate, or a more subjective approach such as that described above. If the third-party meets the qualifying criteria, the E-signing workflow can be unpaused and the third-party can sign the E-document and upload the E-document to the online service provider.

In some embodiments, the online electronic signature service provider can optionally inform the document sender and document signer that the third-party has provided relevant information for the qualifying criteria and may also provide access to the qualifying criteria for a limited time. In this manner, the document sender may elect to review the relevant information before accepting the third-party and allowing the third-party to execute the E-document.

Once the document sender agrees and the third-party signs the E-document, the E-document is signed as between the document sender, the document signer, and the third-party. A final copy of the signed agreement can then be securely sent to all three parties.

During each online detour when the E-signing workflow is paused as described above, all relevant information can be collected and automatically made a part of the audit trail.

Audit Trail

As noted above, the use of online detours during the E-signing workflow permits an audit trail to be automatically developed that is comprehensive, complete, and detailed as to the transactions, documents, and events that took place during the E-signing workflow. The audit trail can now be stored in a secure location for future use. As but one example of an audit trail, consider FIG. 5.

There, an example audit trail is shown generally at 500. The audit trail is typically assembled during the activities that take place during the E-signing workflow and when the E-signing workflow is paused to collect and process qualifying criteria. The audit trail thus constitutes an ongoing record of the E-signing workflow and events leading to execution of the E-document. In this particular example, the audit trail 500 includes a header portion 502 that includes information associated with the audit trail such as, by way of example and not limitation, creation date, the person who caused the audit trail to be created, status of the associated agreement, and transaction ID. In addition, the audit trail 500 includes an entry portion that logs entries associated with transactions, documents, and events that took place during the E-signing workflow and when the workflow was paused to collect and process qualifying criteria. In this particular example, the entries can include descriptive text, a date, a time, and information associated with any documents that might have been provided during the E-signing workflow and when the workflow was paused.

For example, the first entry indicates when the E-document was created and by whom, as well as the time the document was created. The third entry indicates when certain qualifying criterion was submitted and by whom during a time when the E-signing workflow was paused. In this particular example, the qualifying criterion is an income record for one of the parties to the agreement. In addition, a link is provided to the income record. The income record can be stored by the online electronic signature service provider in a secure location. In this manner, large amounts of information can be maintained and tracked in an event information is needed in the future. The sixth entry indicates that a rules check was performed with respect to the qualifying criteria when the E-signing workflow was paused and that the subject passed. This can be an important entry should verification of the qualifying criteria be questioned.

Having considered an example audit trail, consider now example methods in accordance with one or more embodiments.

Example Method

Figure 6:
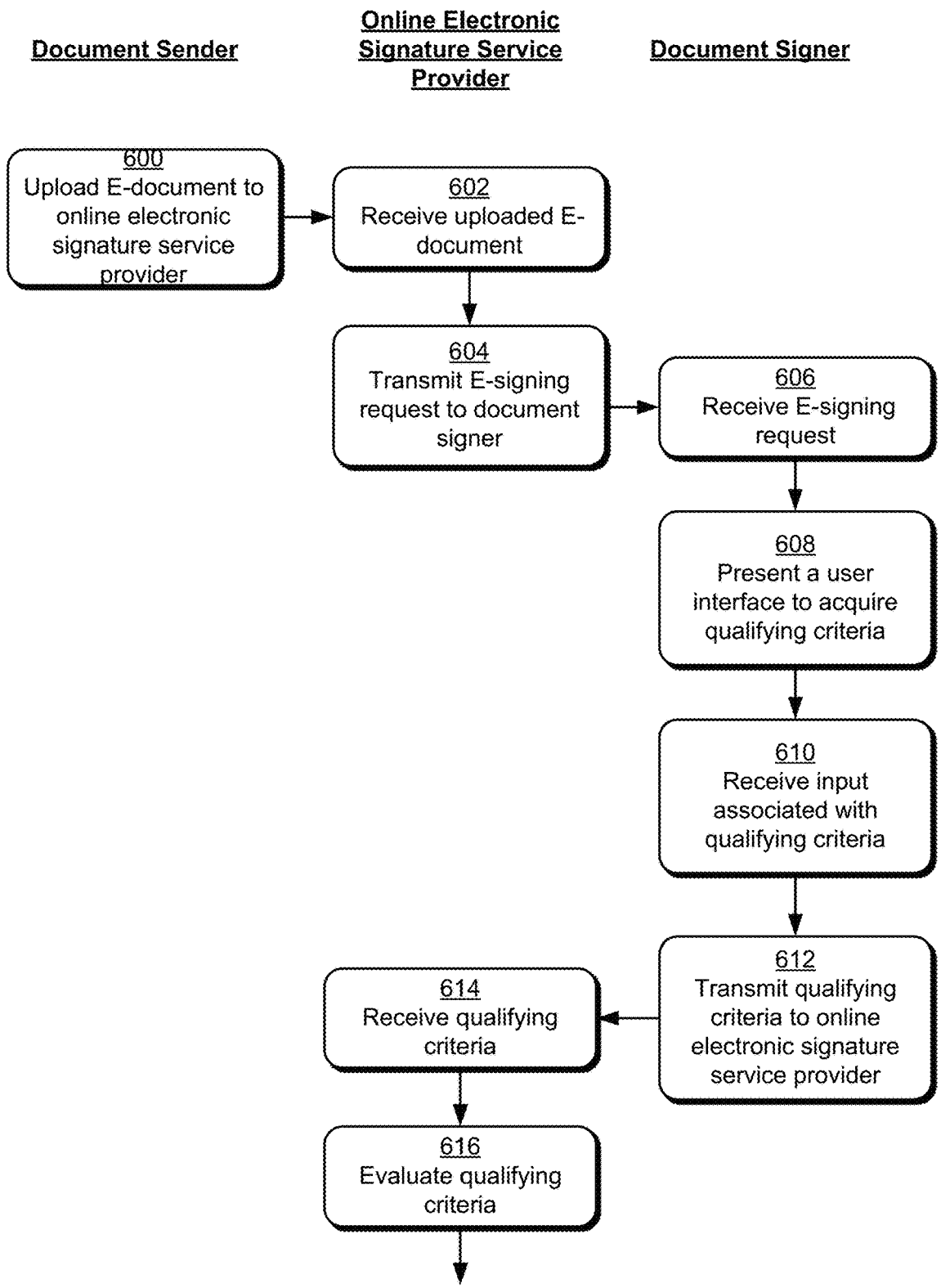
FIG. 6 is a flow diagram depicting an example procedure in accordance with one or more implementations.

FIG. 6 illustrates an example procedure for performing an online detour in accordance with one or more embodiments. In this particular example, the procedure is described in the context of three entities that are responsible for performing various aspects of the procedure—the document sender, the online electronic signature service provider, and the document signer.

Aspects of the procedures may be implemented in hardware, firmware, software, or a combination thereof. The procedures are shown as a set of blocks that specify operations performed by one or more devices and are not necessarily limited to the orders shown for performing the operations by the respective blocks. In at least some embodiments, the procedures may be performed in a digital medium environment by a suitably configured device, such as the example computing devices 102, 102*a* and service provider 112 of FIG. 1.

To begin the procedure, the document sender using, at least in part, an E-signing application, builds an E-document. The E-document is configured to define a contractual agreement between the document sender and at least one document signer. In some instances, the document sender may know the identities of one or more third parties that are to be included in the agreement and may add the corresponding names to the E-document. In other instances, the document sender may not know the identities of the other third parties, but may provide spaces for a document signer to add the names and contact information of the third parties. The E-document is then uploaded to an online electronic signature service provider (block 600) by a document sender to initiate an E-signing workflow. An example of an E-document is provided above.

The online electronic signature service provider receives the uploaded E-document (block 602) and processes the E-document. This includes identifying document signers who are to sign the E-document and any qualifying criteria specified by the document sender. The online electronic signature service provider then pauses the E-signing workflow to transmit an E-signing request to one or more document signers (block 604).

The document signer or signers receive the E-signing request (block 606) and a user interface is presented, at block 608, to acquire any qualifying criteria that was specified by the document sender. Transmission of the E-signing request to acquire the qualifying criteria effectively causes the E-signing workflow to be paused to enable the qualifying criteria to be collected. An example of how this can be done is provided above. Input associated with the qualifying criteria is received at block 610. This input can include supporting documentation satisfying the qualifying criteria, permissions associated with enabling the online electronic signature service provider to acquire qualifying criteria for the document signer, and the like. Qualifying criteria and related information is transmitted to the online electronic signature service provider at block 612.

A response including the qualifying criteria and related information is received, by the online electronic signature service provider, at block 614. The qualifying criteria is then evaluated or verified, at block 616, to ascertain whether the document signer will be permitted to sign the E-document. Note that in addition to transmitting the qualifying criteria to the online electronic signature service provider, the document signer may also have provided contact information for any third parties that are to be a party to the E-document or otherwise participate in the process. This will enable the online electronic signature service provider to contact the third parties to secure any related qualifying criteria and signatures, as further described below.

Figure 7:
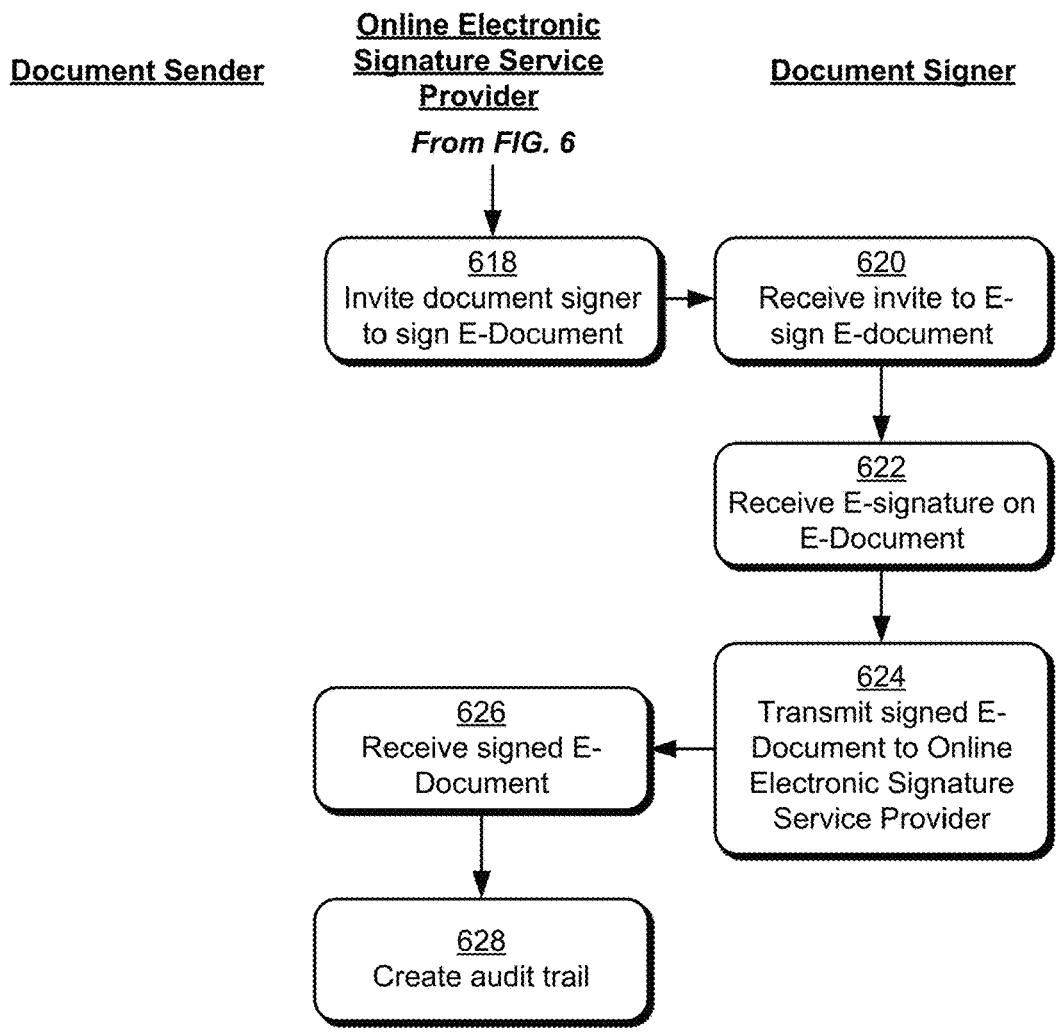
FIG. 7 is a flow diagram depicting an example procedure in accordance with one or more implementations.

Continuing with FIG. 7 and assuming that the evaluation of the qualifying criteria for the document signer is favorable, the E-signing work flow is unpaused and the document signer is invited to E-sign the E-document (block 618). This operation can be performed by enabling the document signer to access the E-document. In some embodiments this can be performed by sending the document signer an e-mail with a secure link that the document signer can click to download the E-document.

The invite to E-sign the E-document is received (block 620). The document signer can now access the E-document whereupon the document signer's E-signature is received on the E-document (block 622). The E-document or its signature information can now be transmitted to the online electronic signature service provider (block 624).

The signed E-document or its signature information is received at block 626 and an audit trail is created at block 628. Although the audit trail is depicted as being created when the signed E-document is received, it is to be appreciated and understood that the audit trail can be created or added to at any time during the E-signing workflow or when the E-signing workflow is paused. An example of an audit trail is described above.

Figure 8:
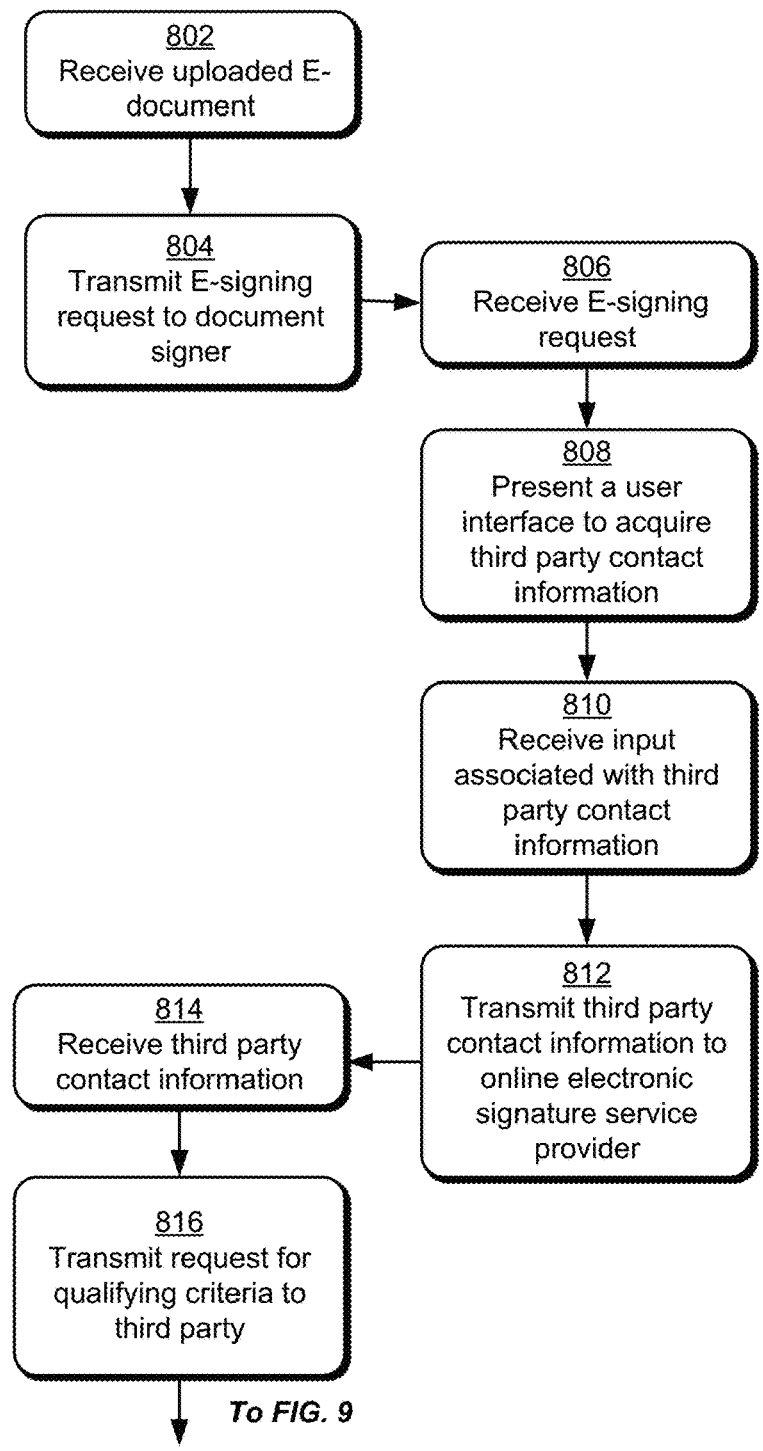
FIG. 8 is a flow diagram depicting an example procedure in accordance with one or more implementations.

FIG. 8 illustrates an example procedure for performing an online detour in accordance with one or more embodiments. In this particular example, the procedure is described in the context of four entities that are responsible for performing various aspects of the procedure—the document sender, the online electronic signature service provider, the document signer and a third party.

Aspects of the procedures may be implemented in hardware, firmware, software, or a combination thereof. The procedures are shown as a set of blocks that specify operations performed by one or more devices and are not necessarily limited to the orders shown for performing the operations by the respective blocks. In at least some embodiments, the procedures may be performed in a digital medium environment by a suitably configured device, such as the example computing devices 102, 102*a* and service provider 112 of FIG. 1.

To begin the procedure, the document sender using, at least in part, an E-signing application, builds an E-document. The E-document is configured to define a contractual agreement between the document sender and at least one document signer. In some instances, the document sender may specify that one or more third parties are to participate either in a signing or non-signing capacity. As such, the E-document may provide spaces for a document signer to add the names and contact information of the third parties. The E-document is then uploaded to an online electronic signature service provider by a document sender to initiate an E-signing workflow. An example of an E-document is provided above.

The online electronic signature service provider receives the uploaded E-document (block 802) and processes the E-document. This includes identifying document signers who are to sign the E-document, third parties who are required to submit qualifying criteria and/or sign the E-document, and any qualifying criteria specified by the document sender that is to be submitted by the document signer. The online electronic signature service provider then pauses the E-signing workflow to transmit an E-signing request to one or more document signers (block 804). The E-signing request can include a request to identify any third parties and their associated contact information.

The document signer or signers receive the E-signing request (block 806) and a user interface is presented, at block 808, to acquire any third-party contact information. This can be performed in conjunction with acquiring any qualifying criteria from the document signer that was specified by the document sender. Alternately, this can be performed separately from acquiring qualifying criteria from the document signer. This effectively causes the E-signing workflow to be paused to enable the online electronic signature service provider to collect and verify qualifying criteria from any required third parties. Input associated with the third-party contact information is received at block 810. The third-party contact information is transmitted to the online electronic signature service provider at block 812.

A response including the third-party contact information is received, by the online electronic signature service provider, at block 814. A request for qualifying criteria is transmitted, at block 816, to one or more third parties.

Figure 9:
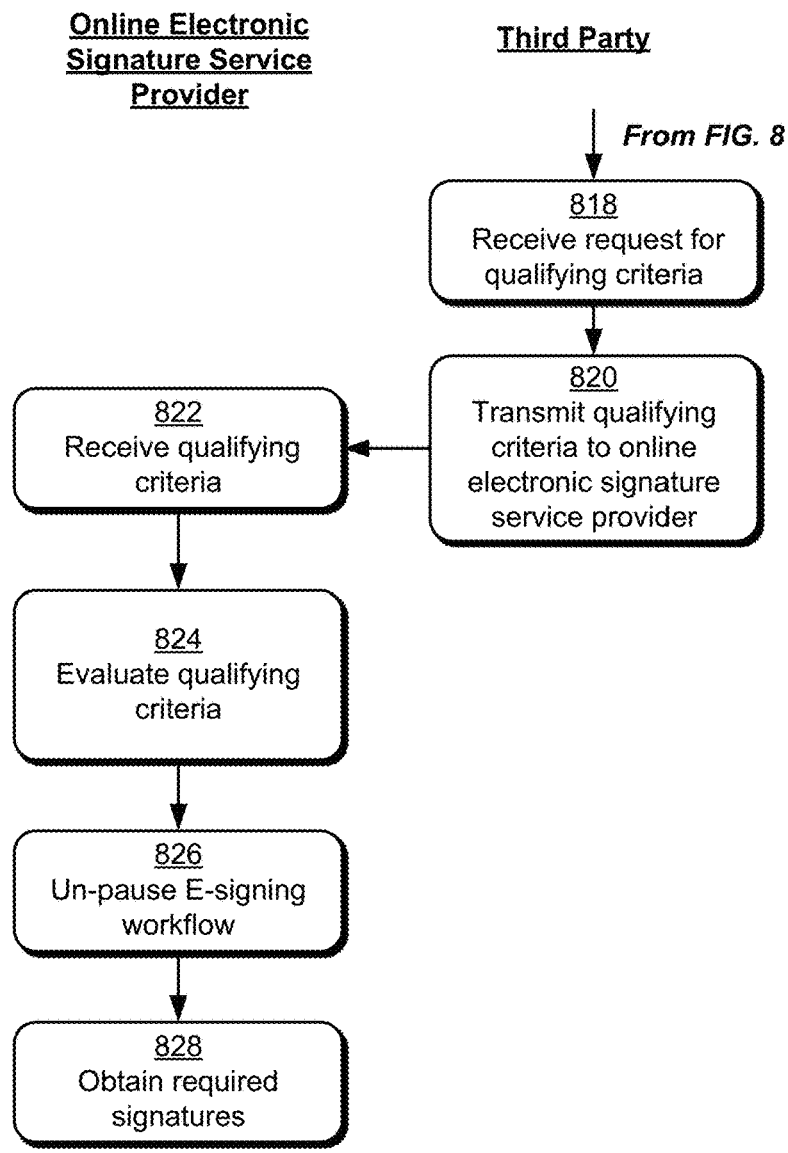
FIG. 9 is a flow diagram depicting an example procedure in accordance with one or more implementations.

Referring to FIG. 9, one or more third parties receive, at block 818, a request for qualifying criteria that was transmitted by the online electronic signature service provider. Qualifying criteria is transmitted, at block 820, to the online electronic signature service provider. This operation can be performed by transmitting the qualifying criteria or by providing permission for the online electronic signature service provider to obtain qualifying criteria on behalf of the third-party. The transmitted qualifying criteria is received, at block 822, by the online electronic signature service provider. The qualifying criteria is evaluated or verified, at block 824. Responsive to a favorable evaluation of the qualifying criteria of the third-party, the E-signing workflow is un-paused at block 826 and required signatures are obtained at block 828. This can include obtaining signatures of any third parties as well as any document signers as described above in relation to FIGS. 6 and 7. In a manner similar to that described above, an audit trail can be created that includes information associated with the third parties. Having considered the above described embodiments, consider now an implementation example in accordance with one or more embodiments.

Implementation Example

The above-described process enabling one or more online detours while pausing an E-signing workflow is particularly useful in a wide variety of scenarios and with a wide variety of agreements such as business rental agreements, house lease agreements, loan agreements, debt settlement agreements, investment agreements, purchase agreements, vendor agreements, licensing agreements, to name just a few. In some of these scenarios a third-party in the form of a guarantor may be required. Guarantors are typically required as co-signers to an agreement when a party, such as a document sender, wishes to have an additional measure of security with respect to performance of the underlying agreement. Many times, guarantors bear a financial responsibility with respect to operation of the agreement defined by the E-document. However, prior to the above-described innovation, there really was no seamless way to establish credit worthiness of the guarantor or signing party as part of an E-signing workflow. That is, the onus of credit checks and guarantor verification would lie on the document sender, which he or she would be forced to do off-line and outside of the E-signing workflow. In addition, many times guarantors would sign a separate agreement outside of the agreement defined by the E-document which would then become an addendum to the original agreement. This reduces the efficiency with which an agreement is executed and increases the amount of work and extra details that need to be managed during and after the process. Further, any such credit check data associated with the guarantor would not be presented inside an audit trail of the E-signed document. This creates a problem particularly if disputes arise after execution of the document.

In various embodiments, a novel detour step can be utilized by pausing an E-signing workflow to enable a document signer to invite another individual as a guarantor to an agreement that he or she wishes to sign. During this detour step, as described above, the newly invited individual can consent acting as a guarantor. The individual who is to act as guarantor can provide various personal details, such as qualifying criteria, to the online electronic signature service provider in order to allow verification of his or her credentials. During this detour, the document sender or online electronic signature service provider can perform verification actions such as a credit check, credit history, and the like, before approving the newly-invited individual to act as a guarantor and subsequently unpausing the E-signing workflow. The E-signing workflow provides a safe and secure way for all document signer's, including guarantors, to provide and share their personal details which can then be used to retrieve credit history and establish credit worthiness. This improves upon past systems in which guarantors would share personal data over e-mail or through physical forms which can be lost or misplaced. Utilizing the secure electronic transfer and communication supported by the online electronic signature service provider provides a very high degree of security and, in addition, enables incorporation of the guarantor's information into the audit trail that becomes part of the E-signing workflow. In some embodiments, the third-party report providers can be securely incorporated into the process such that the online electronic signature service provider, once authorized by the guarantor, can securely obtain the guarantor's credit information.

The E-signing workflow is seamless and flexible insofar as permitting the document sender to define certain qualifying criteria before accepting a party as a guarantor. The online electronic signature service provider can then, on behalf of the document sender, obtain the qualifying criteria and, as appropriate, share the criteria with the document sender for verification. In addition, in various embodiments, the document sender or online electronic signature service provider may specify or define similar ongoing qualifying criteria for the guarantor or signing party during the term of the agreement defined by the E-document. This helps ensure that the credit worthiness of the guarantor or other signing parties has not suffered and that the document sender remains in a relatively safe and secure position insofar as continuing to perform under the agreement defined by the E-document. This can be very important in scenarios such as corporate loans and home mortgage segments where a guarantor's or signing party's prospects may have changed during the term of a particular contract. The ongoing verification can be easily made part of the audit trail to provide a single source to obtain information with respect to activities associated with execution of the agreement as well as the ongoing performance of the agreement and conditions surrounding the parties to the agreement.

Having considered an example procedure in accordance with one or more implementations, consider now an example system and device that can be utilized to practice the inventive principles described herein.

Example System and Device

Figure 10:
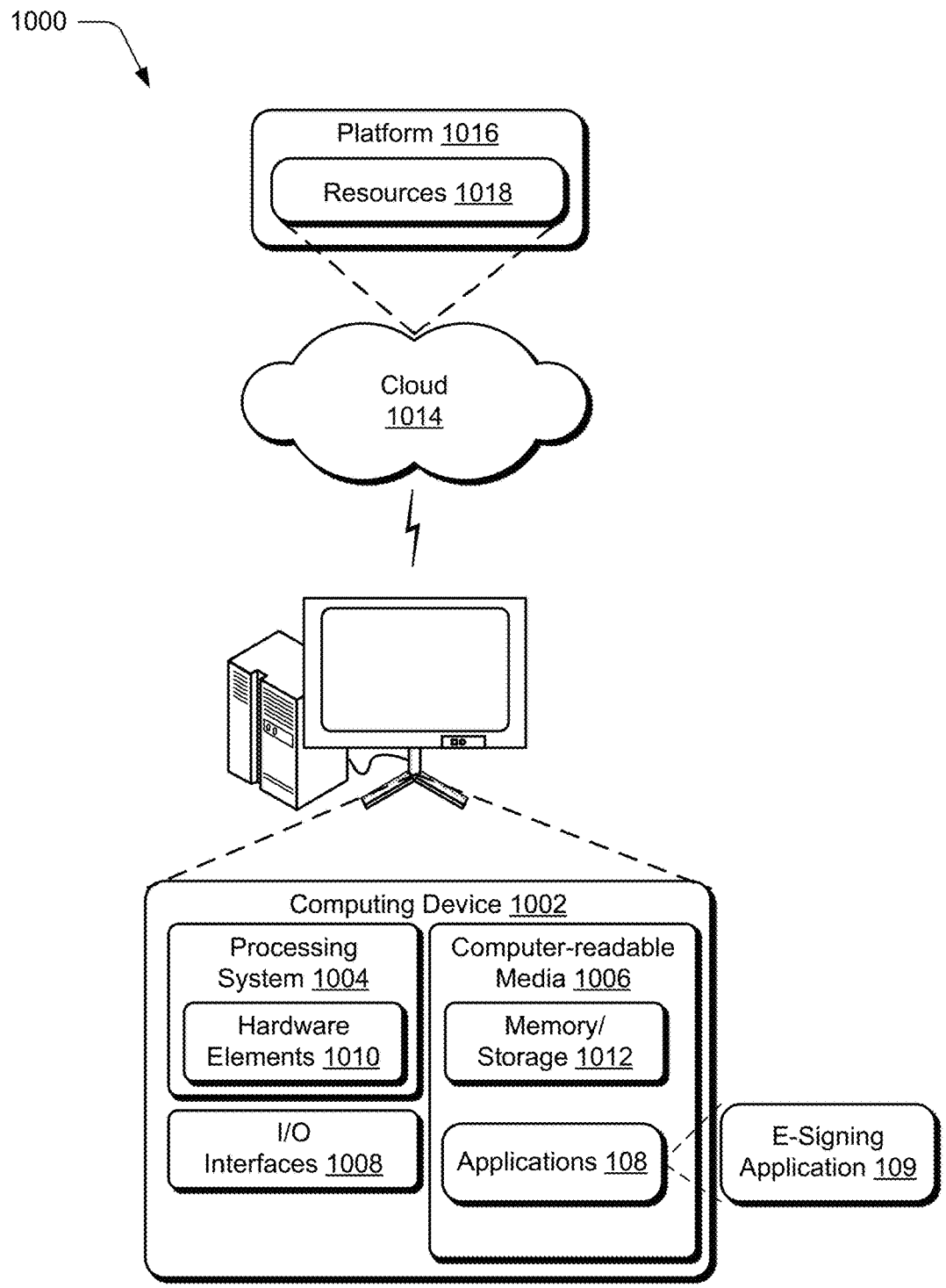
FIG. 10 illustrates an example system including various components of an example device that can be employed for one or more search implementations described herein.

FIG. 10 illustrates an example system generally at 1000 that includes an example computing device 1002 that is representative of one or more computing systems and/or devices that may implement the various techniques described herein. This is illustrated through inclusion of the applications 108 and, in particular, E-signing application 109, which operates as described above. The computing device 1002 may be, for example, a server of a service provider, a device associated with a client (e.g., a client device), an on-chip system, and/or any other suitable computing device or computing system.

The example computing device 1002 includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Various embodiments control an E-document electronic-signing workflow based on criteria specified by a document sender. An E-document is received from a document sender and defines a contractual agreement between the document sender and at least one document signer. The E-document is processed to identify the document signer and qualifying criteria specified by the document sender. The qualifying criteria pertains to criteria that is required before the document signer can sign the E-document. The E-signing workflow is paused to transmit a request to a third party for the criteria that is required before the document signer can sign the E-document. The required criteria is received and, responsive to an evaluation of the criteria, the E-signing workflow is unpaused to invite the document signer to E-sign the E-document.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment including a computing device useable by an online electronic signature service provider that provides services to facilitate electronic signing (E-signing) of an electronic document (E-document), an improved E-signing method implemented by the computing device, the method comprising:
   receiving, by the computing device, the E-document from a document sender, the E-document configured to define a contractual agreement between the document sender and at least one document signer;
   transmitting, by the computing device, an E-signing request to the at least one document signer, the E-signing request including an indication of qualifying criteria specified by the document sender;
   outputting, by the computer device, a user interface as part of an E-signing workflow, the user interface including:
      a user interface portion configured to receive a document that establishes a first criterion of the qualifying criteria;
      a first user interface instrumentality for the first criterion that is selectable to securely provide the document to the online electronic signature service provider; and
      a second user interface instrumentality that is selectable to authorize the online electronic signature service provider to acquire a second criterion of the qualifying criteria on behalf of the at least one document signer;
   receiving, by the computing device, the document and authorization for the online electronic signature service provider to acquire the second criterion on behalf of the at least one document signer;

pausing the E-signing workflow and transmitting, by the computing device, a request to a third party for the second criterion before the at least one document signer can sign the E-document;

receiving, by the computing device, the second criterion from the third party while the E-signing workflow is paused;

verifying, by the computing device, the second criterion while the E-signing workflow is paused; and unpausing the E-signing workflow and transmitting, by the computing device, an invitation to the at least one document signer to E-sign the E-document.

2. The method as described in claim 1, wherein transmitting the invitation comprises sending the at least one document signer an e-mail with a secure link to enable the E-document to be downloaded or viewed.

3. The method as described in claim 1, further comprising creating an audit trail that describes events, event dates, and supporting documents associated with the E-document and storing the audit trail in a secure location.

4. The method as described in claim 1, further comprising prior to the pausing, receiving, from the at least one document signer, a name and contact information of the third-party; and, responsive to receiving the name and contact information, performing the pausing.

5. The method as described in claim 1, wherein the third-party comprises a guarantor.

6. The method as described in claim 1, wherein the qualifying criteria includes at least one of a credit score, a credit history check, a criminal background check, a residency record, or an income record.

7. The method as described in claim 1, further comprising collecting audit trail information while the E-signing workflow is paused.

8. In a digital medium environment in which a computing device enables an online electronic signature service provider to facilitate electronic signing (E-signing) of an electronic document (E-document), one or more computer-readable storage media comprising instructions that are stored thereon that, responsive to execution by the computing device, causes the computing device to perform operations comprising:

receiving the E-document from a document sender, the E-document defining a contractual agreement between the document sender and at least one document signer;

transmitting an E-signing request to the at least one document signer, the E-signing request including an indication of qualifying criteria specified by the document sender;

outputting a user interface as part of an E-signing workflow, the user interface including:
a user interface portion configured to receive documents that establish a first criterion of the qualifying criteria;
a send button that is selectable to securely send the documents to the online electronic signature service provider; and
a user interface instrumentality that is selectable to authorize the online electronic signature service provider to acquire a second criterion of the qualifying criteria on behalf of the at least one document signer;

pausing the E-signing workflow;

receiving the documents and authorization for the online electronic signature service provider to acquire the second criterion on behalf of the at least one document signer while the E-signing workflow is paused;

receiving the second criterion from a third party while the E-signing workflow is paused;

unpausing the E-signing workflow; and inviting the at least one document signer to E-sign the E-document.

9. The one or more computer-readable storage media as described in claim 8, wherein the qualifying criteria includes at least one of a credit score, a credit history check, a criminal background check, a residency record, or an income record.

10. The one or more computer-readable storage media as described in claim 8, wherein the third party is a guarantor.

11. The one or more computer-readable storage media as described in claim 8, further comprising creating an audit trail that describes events, event dates, and supporting documents associated with the E-document.

12. The one or more computer-readable storage media as described in claim 11, wherein the audit trail includes a creation date and at least one transaction identification.

13. The one or more computer-readable storage media as described in claim 8, wherein inviting the at least one document signer includes sending the at least one document signer an e-mail with a secure link to enable the E-document to be downloaded or viewed.

14. The one or more computer-readable storage media as described in claim 8, further comprising:
receiving the E-document having an E-signature from the at least one document signer; and
providing a copy of the E-document having the E-signature to the third party and the document sender.

15. A system comprising:
receiving an electronic document (E-document) from a document sender, the E-document defining a contractual agreement between the document sender and at least one document signer;
transmitting an electronic signature (E-signature) request to the at least one document signer, the E-signature request including an indication of qualifying criteria specified by the document sender;
outputting a user interface as part of an electronic signing (E-signing) workflow, the user interface including:
a user interface portion configured to receive documents that establish a first criterion of the qualifying criteria;
a send button that is selectable to securely send the documents to an online electronic signature service provider; and
a user interface instrumentality that is selectable to authorize the online electronic signature service provider to acquire a second criterion of the qualifying criteria on behalf of the at least one document signer;
means for pausing the E-signing workflow;
means for receiving the documents and authorization for the online electronic signature service provider to acquire the second criterion on behalf of the at least one document signer while the E-signing workflow is paused;
means for unpausing the E-signing workflow; and
creating an audit trail that describes events, event dates, and supporting documents associated with the E-document.

16. The system as described in claim 15, further comprising receiving the second criterion from a third party.

17. The system as described in claim 16, wherein the third party is a guarantor.

18. The system as described in claim 15, further comprising inviting the at least one document signer to electronically sign (E-sign) the E-document.

19. The system as described in claim 15, wherein the qualifying criteria includes at least one of a credit score, a credit history check, a criminal background check, a residency record, or an income record.

20. The system as described in claim 15, wherein the audit trail includes a creation date and at least one transaction identification.

* * * * *